(12) United States Patent
Rovati et al.

(10) Patent No.: US 7,099,512 B2
(45) Date of Patent: Aug. 29, 2006

(54) PROCESS AND DEVICE FOR GLOBAL MOTION ESTIMATION IN A SEQUENCE OF IMAGES AND A COMPUTER PROGRAM PRODUCT THEREFOR

(75) Inventors: Fabrizio Rovati, Cinisello Balsamo (IT); Pierluigi Gardella, Montanaso Lombardo (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 710 days.

(21) Appl. No.: 10/407,162

(22) Filed: Apr. 4, 2003

(65) Prior Publication Data

US 2003/0189548 A1    Oct. 9, 2003

(30) Foreign Application Priority Data

Apr. 9, 2002    (EP)    .................... 02425219

(51) Int. Cl.
*G06K 9/36*    (2006.01)
*G06K 9/46*    (2006.01)

(52) U.S. Cl. ..................................... 382/236
(58) Field of Classification Search ................ 382/218, 382/232, 236, 238, 253, 254, 272, 305; 375/240.12, 375/240.13, 240.15, 240.16, 240.17, 240.22; 348/97, 699

See application file for complete search history.

(56) References Cited

U.S. PATENT DOCUMENTS

| | | | |
|---|---|---|---|
| 5,398,068 A * | 3/1995 | Liu et al. | 375/240.16 |
| 5,510,834 A | 4/1996 | Weiss et al. | |
| 6,014,181 A | 1/2000 | Sun | |
| 6,205,178 B1 | 3/2001 | Suzuki et al. | |
| 6,385,245 B1 * | 5/2002 | De Haan et al. | 375/240.16 |
| 6,418,166 B1 * | 7/2002 | Wu et al. | 375/240.12 |
| 6,614,847 B1 * | 9/2003 | Das et al. | 375/240.16 |
| 6,707,853 B1 * | 3/2004 | Cook et al. | 375/240.16 |

(Continued)

FOREIGN PATENT DOCUMENTS

DE    19712785    7/1998

(Continued)

OTHER PUBLICATIONS

E. Dubois, et al., "Motion Estimation and Motion-Compensated Filtering of Video Signals", Proceedings of the International Conference on Acoustics, Speech and Signal Processing (ICASSP), New York, IEEE 0-7803-0946-4/93, US, vol. 4, pp. I-95-98.

*Primary Examiner*—Amir Alavi
(74) *Attorney, Agent, or Firm*—Hogan & Hartson L.L.P.

(57) ABSTRACT

A process for realizing an estimate of global motion based on a sequence of subsequent video images, such as those received via an optical mouse (M) for the purposes of detecting its movement. Subsequent video images are represented by digital signals arranged in frames and for each estimate of a frame with respect to another, the procedure provides operations for choosing, from amongst a series of vectors originating from linear combinations of motion vectors resulting from estimates of previous frames and/or constant vectors, a vector considered as the best match for estimating the motion occurring between the two frames, the said selection operation in turn including the operations of performing a virtual overlay of the two frames to be compared ($T_0$, $T_0-1$) mutually offset both horizontally and vertically by amounts identified by the motion vector subjected to testing, applying a selective grid of pixels to be subjected to testing, and calculating, for all pixels selected via the grid, a cost function to determine the effectiveness of the predictor, identifying the vector with the lowest cost function value as the best for the purposes of estimation.

23 Claims, 8 Drawing Sheets

Superpose frame ( To ) and matching mask
Superpose frame ( To-1) with offset given by motion vector
Evaluate MAE on pixels evidenced by mask

U.S. PATENT DOCUMENTS

| | | | |
|---|---|---|---|
| 6,760,478 B1 * | 7/2004 | Adiletta et al. | 382/236 |
| 6,925,121 B1 * | 8/2005 | Komiya et al. | 375/240.16 |
| 2003/0072373 A1 * | 4/2003 | Sun | 375/240.16 |

FOREIGN PATENT DOCUMENTS

| | | |
|---|---|---|
| EP | 0 917 363 | 11/1997 |
| EP | 0 944 245 | 3/1998 |
| EP | 1094671 | 4/2001 |
| FR | 2 604 049 | 3/1988 |
| WO | WO 99/16251 | 4/1999 |
| WO | WO 00/70879 | 5/1999 |

* cited by examiner

Frame (To)

Frame (To-1)

V(To-1)

Matching mask:
Black pixel: do not use
Pixel transparent: do use

Fig-3

Superpose frame (To) and matching mask
Superpose frame (To-1) with offset given by motion vector
Evaluate MAE on pixels evidenced by mask

PROCESS AND DEVICE FOR GLOBAL MOTION ESTIMATION IN A SEQUENCE OF IMAGES AND A COMPUTER PROGRAM PRODUCT THEREFOR

FIELD ON THE INVENTION

The present invention relates to the estimation of global movement in a sequence of images having particular applicability to optical mouses.

BACKGROUND OF THE INVENTION

The invention has been developed with a view to possible applications in new generation mouses (or mice) that, instead of detecting motion imparted by the user via a ball or sphere as used in current mice, are capable of using a video sensor or other types of sensors that provides an output signal with an array of digital values encoded in N bits, such as capacitive sensors used in touch-chips for detecting fingerprints, in new-generation telephones or the so-called portable digital assistants (PDA), or even in optical pens for text processing and similar applications.

In this context, it is necessary to process the video frames generated in output by the video sensor (telecamera) and determine the motion imparted by the user to the object (mouse, pen, etc.) on which the sensor is mounted.

In these situations, the sensor captures the images in movement of the surface that is being passed over. This motion can be reconstructed from the relative positions of the successive images that are sampled by the sensor. In the case of an optical mouse, once the relative motion between two images is identified, it is possible to deduce the displacement that must be given to the mouse pointer on the screen. The same information can obviously be used in different ways for other applications, such as those previously mentioned.

For applications of the above-described type (optical mice for example), recourse to complex, phase-correlation algorithms between the images and/or edge detection is well known. In all cases, the solutions are characterized by high computational intensity.

OBJECTS AND SUMMARY OF THE PRESENT INVENTION

The objective that the present invention sets itself is therefore that of providing a solution for estimating global motion in a sequence of images giving rise to a much lower computational requirement, and thus a level of circuit complexity with respect to the known solutions briefly mentioned beforehand. According to the invention, this objective is achieved thanks to a process possessing the characteristics specifically referred to in the claims that follow.

The invention also relates to the corresponding system, as well as the corresponding computer program product, i.e. the product that can be directly loaded into the internal memory of a digital computer and including software code portions capable of implementing the process according to the invention when the computer product is run on a digital computer.

The solution according to the invention is conceptually inspired by recursive motion estimating already utilized in signal coding contexts, as documented in the European patent applications EP-A-0 917 363 and EP-A-0 944 245, both in the name of the present Applicant.

The solution according to the invention is however substantially different from these two solutions developed in the digital video signal-encoding sphere due to the different field of application and for the consequent necessity of arriving at an overall reformulation of the procedure.

In the currently preferred embodiment, the solution according to the invention provides for the realization of a global estimate of motion in a consecutive images stream, taken with a camera for example. This result is preferably achieved via recursive motion estimating techniques, based on adapting matching blocks and with the aid of an adaptive estimation algorithm. In particular, testing is performed on a number of vectors obtained via the linear combination of vectors derived from previous estimates and constant vectors, thus combining the results of partial estimates and constant vectors in a linear manner. Each test is performed using a cost function, such as—by way of a non-limitative example—the MAE function (acronym for Mean Absolute Error), applied to a dynamically defined form within the scope of the current and predictor frames. The predictor frames can be chosen in an adaptive manner as one or more of the frames that precede the current frame.

As it has already been stated, typical examples of potential applications of the solution according to the invention are digital mice, mice integrated with mobile phones or in so-called personal digital assistants (PDA) and optical pens for handwriting recognition.

BRIEF DESCRIPTION OF THE DRAWINGS

The invention will now be described, purely by way of a non-limitative example and with reference to the enclosed drawings, where.

DETAILED DESCRIPTION

The motion estimation considered here (of an optical mouse, for example) must resolve the problem of estimating the global motion flow inherent to a sequence of consecutive images.

Each frame is normally composed of only a few pixels (e.g. 20×20 pixel frames), but the frame rate is very high (e.g. 9600 frames/sec) to ensure the detection of sudden movements.

Naturally, the aforementioned frame size and frame rate values are purely to give an idea of the quantities involved and for the sole purpose of focusing ideas for a better understanding of the description that follows. It is evident however, that the solution according to the invention is also applicable in cases where different frame sizes and rates are used.

Substantially, the solution according to the invention is based on the same assumptions underlying the solutions described in the previously cited European patent applications EP-A-0 917 363 and EP-A-0 944 245, that is to say there exists a strong correlation between estimates that are mutually "adjacent", together with a "linearisability" of the global motion, given the high number of frames per second.

Figure 1:
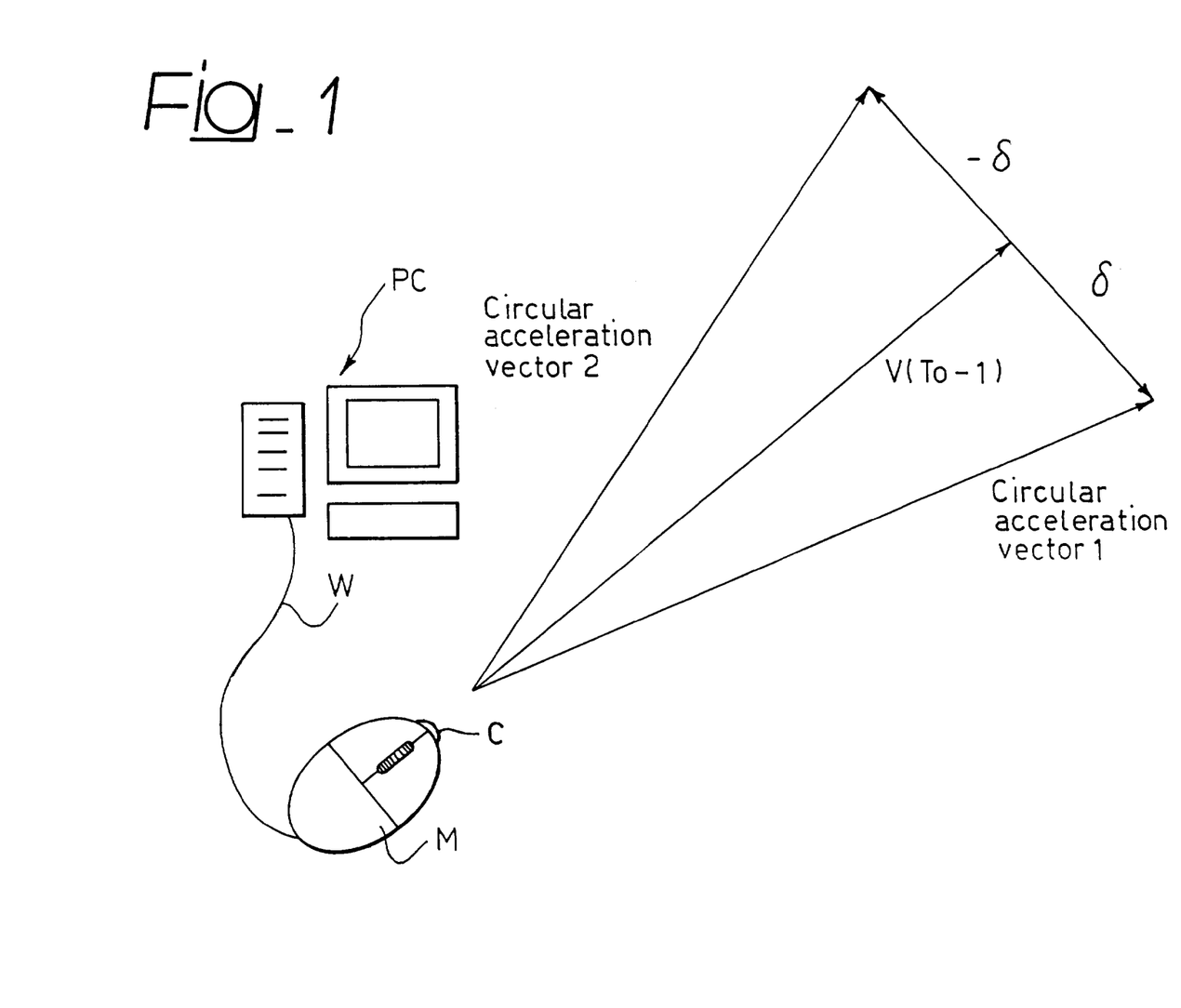
FIG. 1 is a sketch that synthetically illustrates the motion estimation mechanism adopted in a solution according to the invention.

In general terms, with reference to the sketch in FIG. 1 and purely by way of example, reference M indicates a mouse associated with a personal computer PC.

Instead of carrying out the function of detecting the motion imparted by the user to the mouse by recognising—as occurs in traditional solutions—the movements imparted to the sphere or ball in the mouse when moving the latter over a contact surface, it is possible to exploit—for the same purposes—the image information supplied by an image sensor—one could naturally think of a web-cam type of telecamera—mounted on the mouse M and generically indicated as C. The mouse M sends the image signal generated by the camera C (capable of adequately defining any image detected within the surrounding environment) to the personal computer PC, upon which the processing functions described in the following are preferable executed. Alternatively, image processing could be performed directly by the mouse, via dedicated circuitry, with only estimated motion information being sent to the PC. It will be appreciated that the sensor C can be configured in a manner to supply images in digital format directly in output, ready for transmission to the personal computer PC via any type of connection (indicated in the example herein in the form of a cable W) existing between the mouse M and the personal computer PC. The sensor C does not necessarily need to be a telecamera, and could be some other type of sensor, even based on other physical principles, but suitable for supplying an array of N bits in output, 20×20 for example, which can be used as frames.

As has already been stated, the motion detection application for a mouse only constitutes one of the numerous possible applications of the solution according to the invention. For other examples—which it should be remembered are just that—of possible applications of the solution according to the invention, please refer to the introductory part of this description.

Turning again to the example of the mouse M in FIG. 1, the movements imparted to the mouse M by the user result in the sensor C sampling and generating a series of digital video images, typically organised in frames, this terminology being obviously derived from television signal processing technology.

The (relative) movement estimate of the said frames generated by the sensor C can be converted (according to known criteria and therefore not requiring a detailed description in this context) into an estimate of the movement of the sensor C and, in consequence, of the mouse M as a whole.

In particular, in the solution according to the invention, estimates are carried out on the frames sampled by the sensor C starting from the video signal generated by the sensor C. Each frame is estimated with respect to one or more preceding frames, for example (but not necessarily) with respect to the immediately preceding one.

Each vector is thus expressed in coordinates having a precision in fractions of a pixel, according to the implementation and depending to the desired precision of estimation.

To focus ideas, but without this having a limitative effect on the scope of the invention, one could think of an estimation precision of a quarter of a pixel.

Pixels with a non-integer precision can be derived via known standard interpolation techniques, such as a simple two-dimensional linear interpolation for example.

On the basis of experiments carried out by the Applicant, a precision of a quarter of a pixel is considered sufficiently accurate for the envisaged applications. Other levels of precision could be half a pixel or an eighth of a pixel for example.

Figure 8:
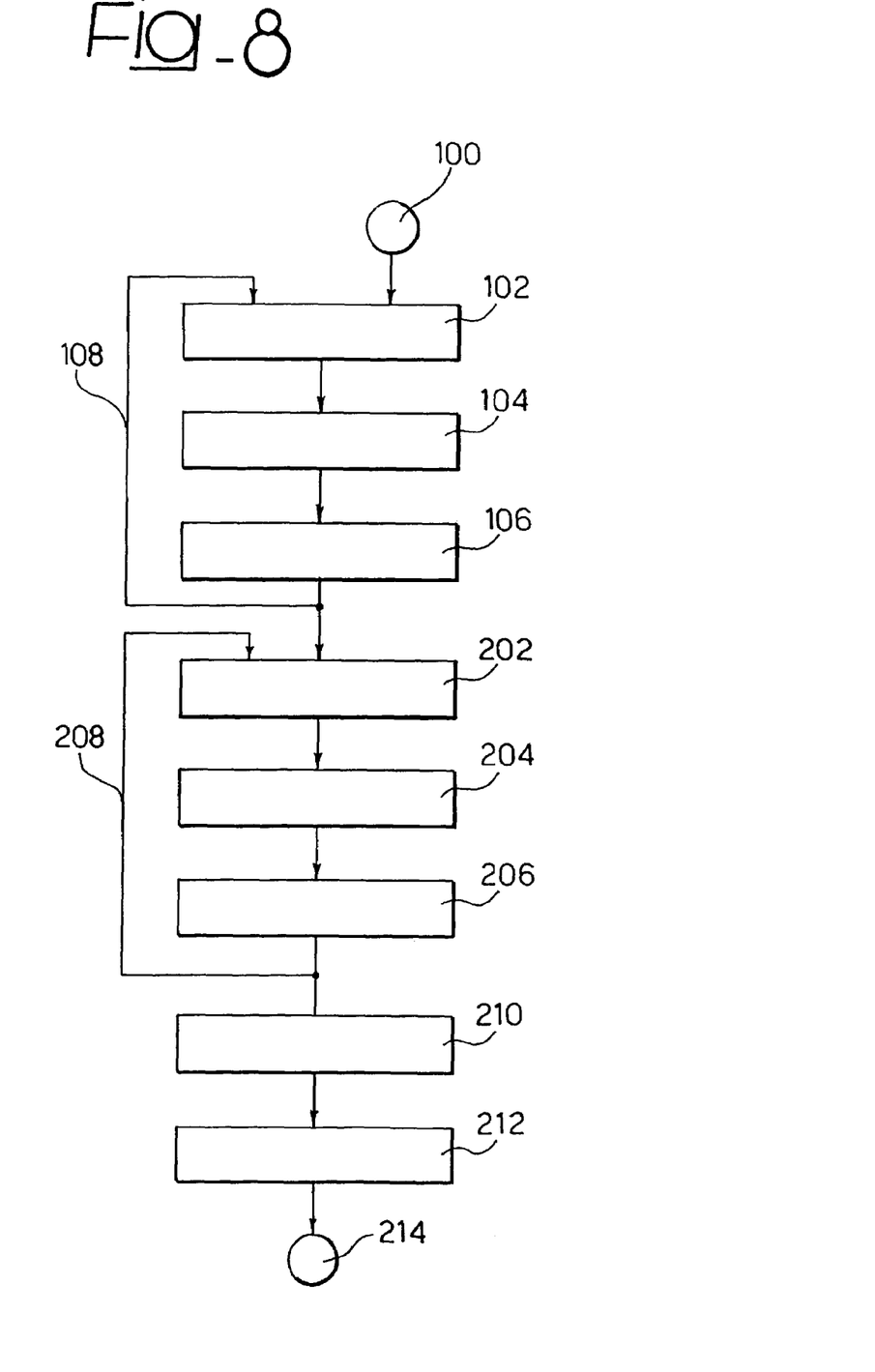
FIG. 8 is a flowchart illustrating the embodiment of the invention.

The procedure represented by the flowchart in FIG. 8 is applied for each estimate of a frame with respect to another.

The starting vectors are constructed, in a known manner and therefore not requiring a detailed description in this context, starting from the last K winning vectors. In practice, the last K winners are stored in a FIFO (First In First Out) memory and the below described linear combinations applied (e.g. for constant acceleration, the difference between the last and penultimate winners is added to the last winner).

Starting from an initial step indicated as 100, in step 102 the digital video signal is analysed by considering a series (consisting of a variable number of readers from 0 to N) of vectors originating from linear combinations of vectors produced by previous frame estimates (so-called SEED vectors) and/or constant vectors). The series is subjected to a selection process to determine which vector is the best for estimating the motion that has effectively occurred between the two frames.

For instance, where V(t) is an estimated vector for indicating the motion between the frame t and the frame t−1, some (non exhaustive) examples of what these SEED vectors could be are given below—naturally with reference to the movement estimate for frame $T_0$ (see also FIG. 1):

constant velocity vector, last: $V(T_0-1)$,
constant velocity vector, penultimate: $V(T_0-2)$,
constant velocity vector, last but two: $V(T_0-3)$,
constant acceleration vector: $V(T_0-1)+(V(T_0-1)-V(T_0-2))$,
constant deceleration vector: $V(T_0-1)-(V(T_0-1)-V(T_0-2))$,
null vector: (0,0),
circular acceleration vector, first: $V(T_0-1)+\delta$, where $\delta$ is an integer vector orthogonal to $V(T_0-1)$: see FIG. 1, and
circular acceleration vector, second: $V(T_0-1)-\delta$: see FIG. 1.

It should be clearly noted that the identification number of the individual SEED vectors could dynamically change over time, following measurements related to operating conditions (estimated motion is null, slow, rapid etc.).

It will be appreciated that in many of the applications previously referred to (the computer mouse application example being valid for all), estimated null motion can assume a significant role, as it corresponds to all situations in which the mouse M is not being used by the user.

In the following—again with reference to the flowchart in FIG. 8—each of the aforesaid vectors is subjected to testing in the subsequent manner.

In a step indicated as 104, the two frames to be compared are (ideally) overlaid, offsetting them in the horizontal and vertical directions by an amount determined by the motion vector. A selection grid for the pixels to be tested is then applied and, for all of the pixels selected by the grid the cost function is calculated, in step 106, to determine the validity of the predictor. The MAE mean absolute error function can be used (by way of example and without being interpreted as a limitation regarding the scope of the invention) as the cost function.

Figure 2:
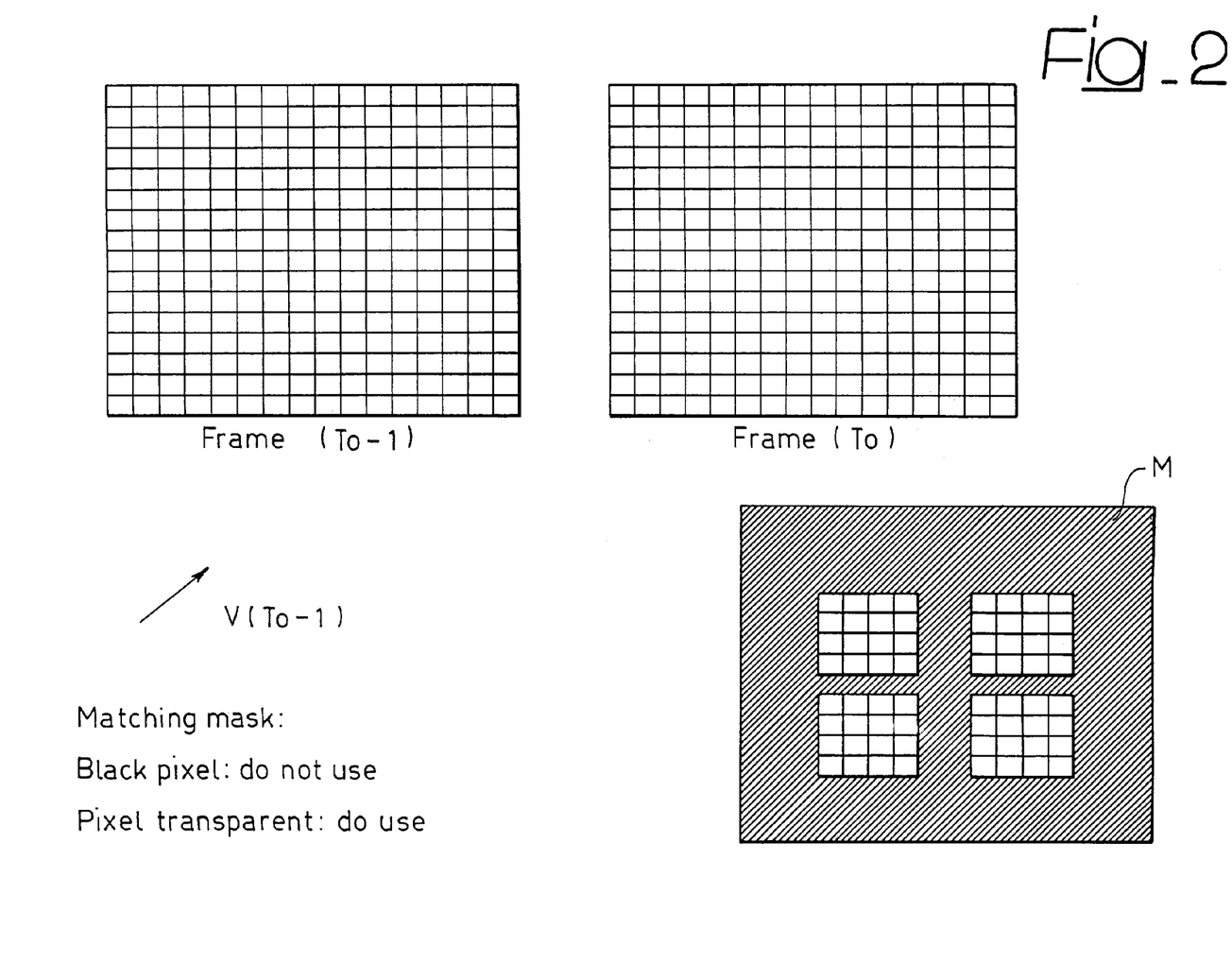
FIG. 2 illustrates some examples of frames and the relative adaptive functions suitable for use within the scope of the present invention.

In particular, the diagram in FIG. 2 shows the frames with ranges $T_0-1$ and $T_0$ at the top, while $V(T_0-1)$ indicates the motion vector being tested. The lower left-hand part of FIG. 2 shows a matching mask presenting, for example, a pattern of transparent pixels that defines a generic window-like shape (four rectangles arranged at the vertices of a rectangle). In the matching mask M shown in FIG. 2, a black pixel unambiguously corresponds with the "do not use" signal, while a transparent pixel corresponds with the "use" signal.

Figure 3:
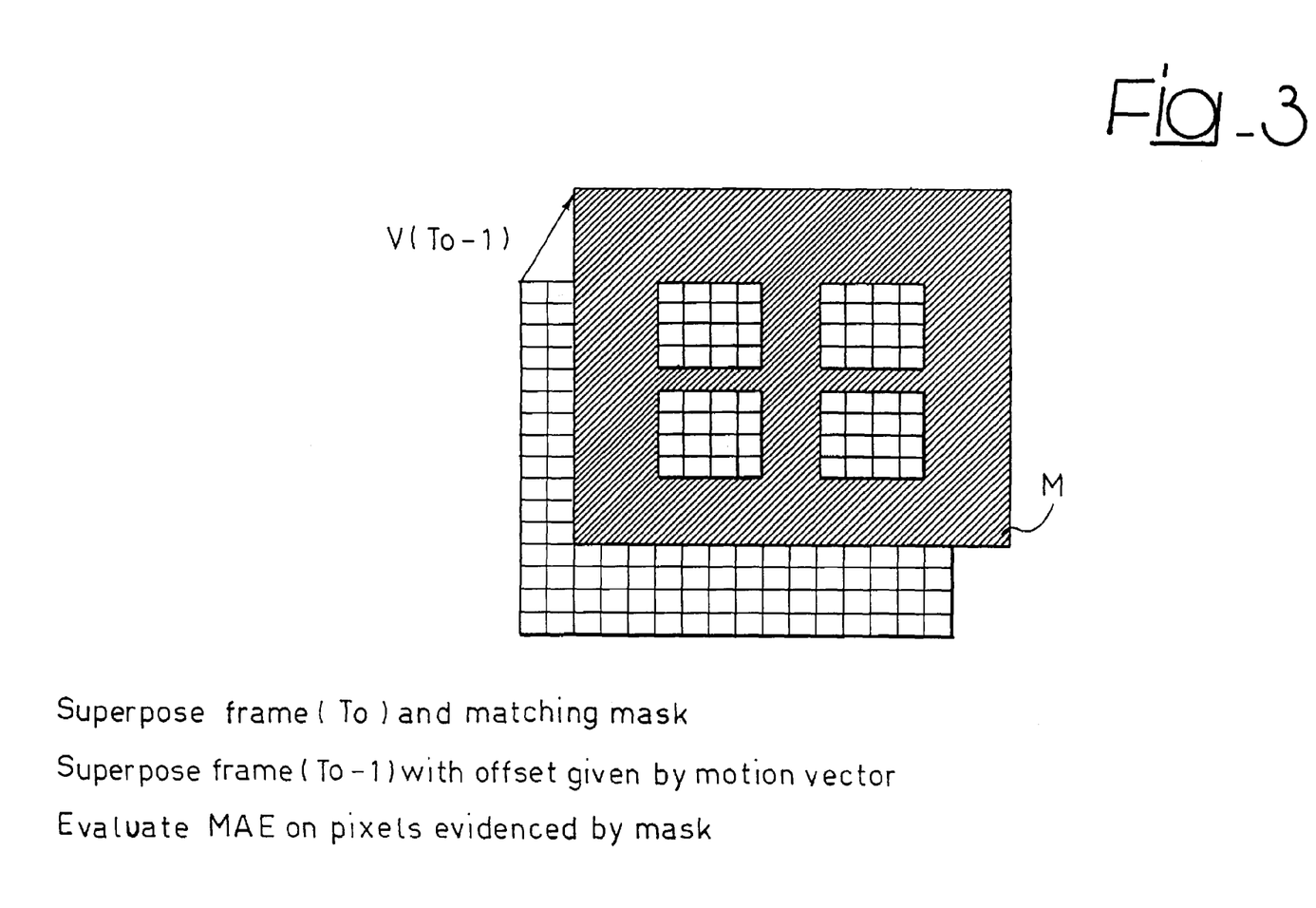
FIG. 3 illustrates the general operational schema of the solution according to the invention in greater detail.

FIG. 3 illustrates the operation, performed at step 104 of the flowchart in FIG. 8, whereby the ordered or ranked frame $T_0$ is laid on top of the matching mask M, and then overlapped by the rank frame $T_0-1$ with an offset given by the motion vector $V(T_0-1)$. Finally, in step 106, the MAE cost function is evaluated for the pixels highlighted by the mask, or rather—more precisely—the transparent pixels of the mask M.

Figure 4:
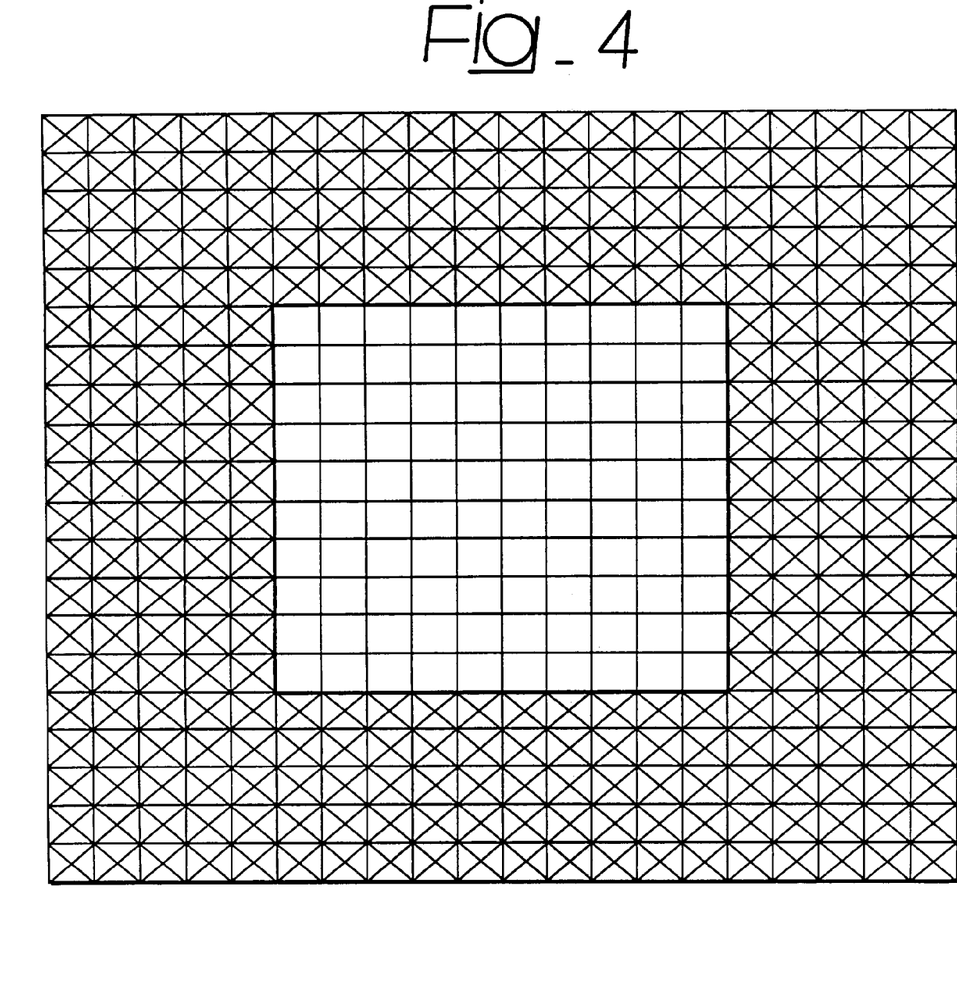
FIGS. 4, 5 and 6 illustrate some examples, although not exhaustive, of matching masks that can be used with the solution according to the invention.
Figure 5:
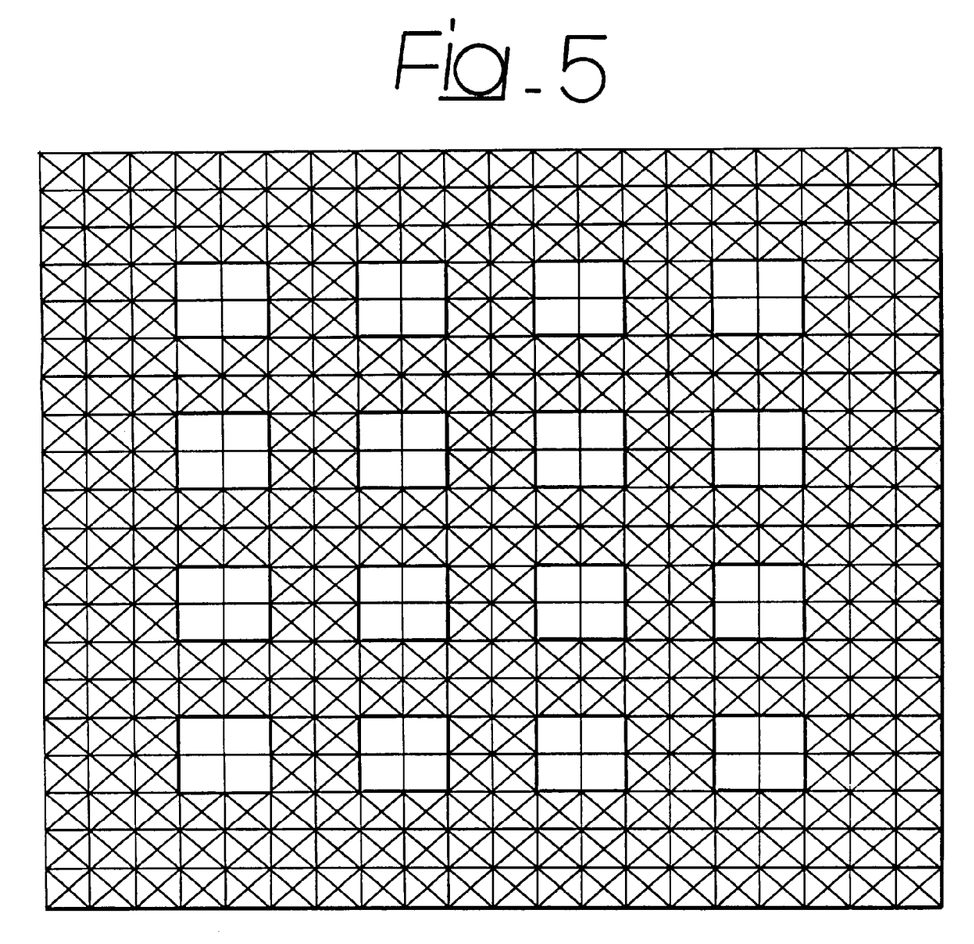
Figure 6:
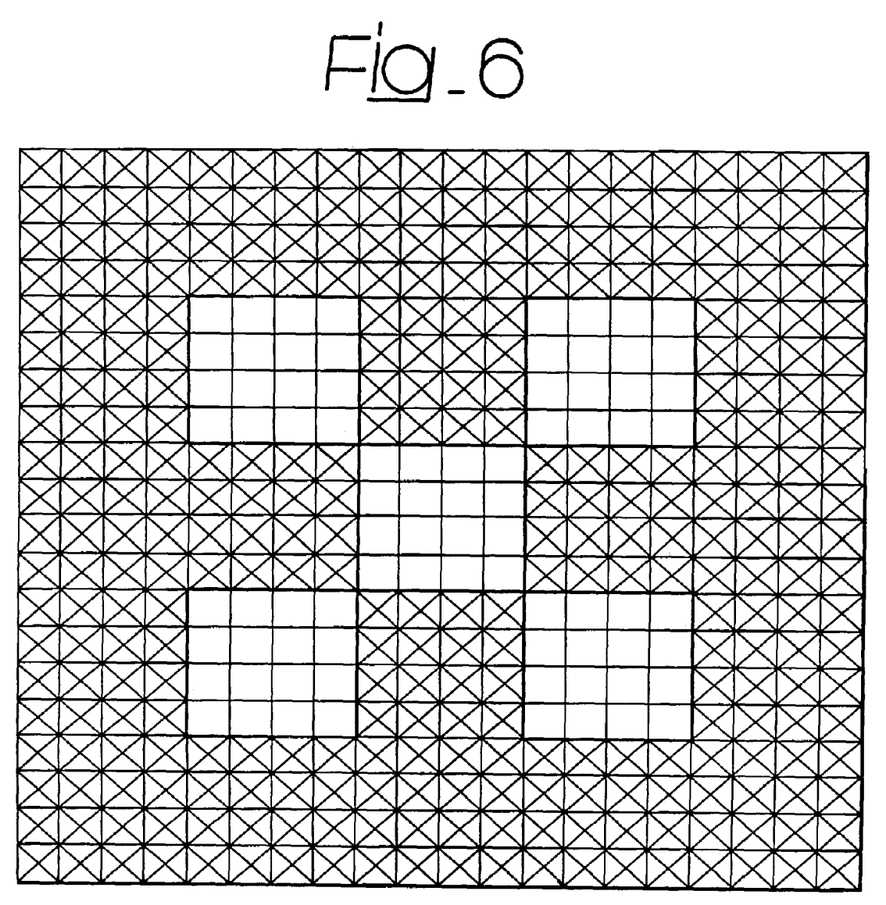

FIGS. 4 to 6 illustrate other examples of matching masks with various types of windowing that can be used.

In the specific case under consideration, or rather a 20×20 pixel frame, the MAE cost function is defined in the following manner.

Given that:
vx and vy are the horizontal and vertical components of the vector under consideration,
p(x,y) is a pixel of the frame $T_0$ for 0=x<20 and 0=y<20, or otherwise 0,
q(x,y) is a pixel of the frame $T_0-1$ for 0=x<20 and 0=y<20, or otherwise 0, and
m(x,y) is the mask coefficient, with a value of 1 if the pixels are to be included in the computation or 0 if otherwise, the MAE cost function is defined as follows:
$MAE = \Sigma |p(i,j) - q(i+vx, j+vy)| * m(i,j)$; where i and j run from 0 to 19.

The described operations are repeated in a loop (reference 108) until all of the SEED vectors have been tested.

At this point, the vector with the least MAE cost function value is chosen as the best vector, winning the first phase of estimation.

Refinement vectors are subsequently applied to this winning vector in a second phase of estimation, known as refinement (REFINE).

In this phase, the said vectors are added to the winning vector of the first phase and the resulting vector is tested as a candidate in the same manner as previously seen for the SEED vectors.

This happens over a set of steps, indicated by references 202 to 206 on the flowchart in FIG. 8, which are essentially clones of the previously described steps 102 to 106, with the same operations of steps 102 to 106 being applied in a loop (reference 208) to the vectors until all of them have been tested.

The refinement vectors can be applied in arbitrary numbers and direction/modulus, according to the final precision that is to be achieved and the cost of the device to be realized.

In this case as well, the number and identity of the refinement vectors can dynamically vary due to operating conditions.

Figure 7:
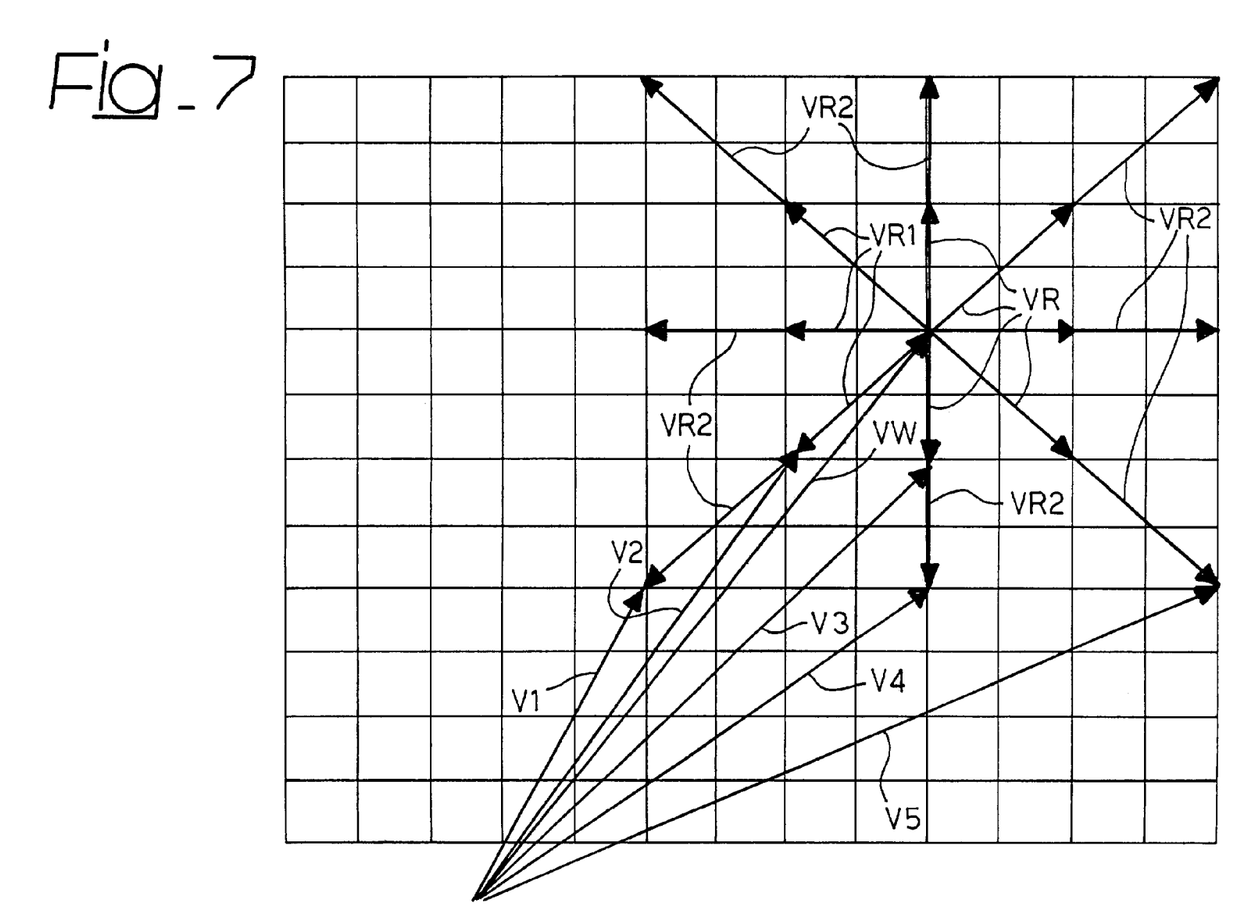
FIG. 7 illustrates the implementation of the solution according to the invention on the basis of a typical vector diagram.

A (non limitative) example is illustrated by the vector representation in FIG. 7, referring to a quarter-pixel grid.

In this figure, reference VW indicates the winning SEED vector, references VR1 and VR2 indicate various refinement vectors, and references V1, V2, etc. indicate the various resultant vectors to be tested.

Each of vectors obtained in this manner is subjected to testing in the same manner as previously indicated (MAE cost function). The application of refinement vectors can be performed one or more times. For example, the SEED vector generation step is applied, a refinement operation to the winner of the phase in question is applied, a second refinement phase to the winner of the first refinement is then applied, etc.

In a successive step indicated as 210, the candidate with the smallest cost function value from those tested (also including the best SEED vector) is chosen as the final estimate of the motion occurring between the sampling of the frames $T_0-1$ and $T_0$. This vector is passed in input to the pointer display system of the personal computer PC.

This vector is also stored in a FIFO queue that will hold the last K winners, which will constitute the starting vectors for constructing the SEED linear combinations to be used in step 102.

The step in which the aforesaid vector is passed in input to the pointer display system of the personal computer is indicated as 212 on the flowchart in FIG. 8. As always, reference 214 indicates the last step of the relative procedure.

Within the described procedure and its implementation, whether at the hardware level (for example, via a dedicated processor) or at the software level (via specific configuration of a general purpose processor, such as the PC to which the mouse M is connected, or via a processor associated with the mouse M, such as a DSP for example), it is possible to store the last sampled frame (current frame) and one or more previous frames, to be used as predictive frames, in memory.

Yet again, depending on the operating conditions, it can be decided whether to carry out the estimate for the current frame based only on the immediately previous frame, on an older one, or on a number of previous frames.

Essentially, with respect to the previously proposed solutions (above all in connection with video signal encoding applications), the solution according to the invention is characterized by a different "work point", characterized by a relatively low frame resolution (e.g. 20×20) counterbalanced by a rather high frame sampling frequency (e.g. 9600 frames per second).

Instead of realizing the movement estimate of many objects that move in an uncorrelated manner within the frame, the solution according to the invention aims at realizing an estimate of just the global motion, actuating a single estimate per frame with no spatial vectors and one time vector. Instead, motion estimating systems for video applications normally perform many block estimates for each frame, with many time/spatial vectors at their disposal.

In addition, while in the previously noted solutions, the error in estimation is not normally critical (except with regards to the opinion of the person observing the sequence of images), error in estimation is more critical for the applications envisaged herein. This is because, for example, the mouse, as perceived by the personal computer to which it is connected, can run the risk of being detected as moving in the wrong direction or by a different amount from that desired.

The solution according to the invention also allows block processing as desired, within the frame's field (20×20, for example) with undetermined precision and distinct operating modes for null, slow and fast motion.

In contrast, traditional solutions for video applications normally contemplate working on (macro) blocks of fixed size 16×16, with a maximum precision of half a pixel and without discrimination between slow and fast motion.

The traditional solutions do not normally provide the possibility of jumping over individual frames (frame skipping), an option that is instead offered by the solution according to the invention, whereby it is possible to skip frames or perform multi-frame prediction operations as desired.

Furthermore, traditional solutions are characterized in that they employ a single time/space step in updates, using "pure" time/space vectors.

On the contrary, the solution according to the invention provides a multiple-step selection function for SEED vectors, with a subsequent refinement function. The whole of the foregoing is based on using linear combinations of time vectors to obtain the SEED vectors.

Of course, without prejudice to the underlying principle of the invention, the constructional details and forms of embodiment could be extensively changed with respect to that described and illustrated, without leaving the scope of this invention, as defined by the annexed claims.

The invention claimed is:

1. A process for performing an estimate of global motion based on a sequence of subsequent video images or the like, such subsequent video images being represented by digital signals arranged in frames, and, for each estimate of a frame with respect to another, comprising:
    choosing, from amongst a series of vectors originating from linear combinations of motion vectors resulting from estimates of previous frames and/or constant vectors, at least one winning vector, considered as the best match for estimating the motion occurring between two frames, including:
    performing a virtual overlay of the two frames to be compared mutually offset both horizontally and vertically by amounts identified by the motion vector subjected to testing;
    applying a matching mask of pixels to be subjected to testing;
    calculating, for all pixels selected, a cost function; and
    identifying the vector with the lowest cost function value as the best vector for the purposes of estimation.

2. The process according to claim 1, in which choosing from amongst a series of vectors comprises choosing from a set of vectors including:
    an ultimate constant velocity vector;
    a penultimate constant velocity vector;
    an antepenultimate constant velocity vector;
    a constant acceleration vector;
    a constant deceleration vector;
    a null vector; and
    first and second circular acceleration vectors.

3. The process according to claim 1, in which said cost function comprises a mean absolute error function.

4. The process according to claim 1, in which said cost function comprises a function defined as $\Sigma|p(i,j)-q(i+vx,j+vy)|*m(i,j)$, wherein:
    vx and vy are the horizontal and vertical components of the vector under consideration;
    p(x,y) are the pixels of a first frame, forced to zero if outside of the frame field;
    q(x,y) is a pixel of a second frame, forced to zero if outside of the frame field; and
    m(x,y) is the coefficient of the mask, with values of one if the respective pixels are to be included in the computation or zero if otherwise.

5. The process according to claim 1, further comprising:
    applying, to said at least one winning vector, refinement vectors, which are added to the said winning vector to produce at least one resulting vector; and
    subjecting said resulting vector to candidate testing.

6. The process according to claim 5, further comprising subjecting said resulting vector to testing based on said cost function.

7. The process according to claim 5, further comprising repeatedly applying said refinement vectors.

8. The process according to claim 1, further comprising saving a last sampled frame as a current frame and at least one previous frame to be used as a prediction frame.

9. The process according to claim 1, further comprising making an estimate for a current frame only on an immediately preceding frame.

10. The process according to claim 1, further comprising making an estimate for a current frame on a frame that is older than an immediately preceding frame.

11. The process according to claim 1, further comprising making an estimate for a current frame on a number of frames from amongst frames preceding the current frame.

12. A system for performing an estimate of global motion based on a sequence of subsequent video images, such subsequent video images being represented by digital signals arranged in frames, comprising:
    a processor including:
    means for choosing amongst a series of vectors originating from linear combinations of motion vectors resulting from estimates of previous frames and/or constant vectors, at least one winning vector, considered as the best match for estimating the motion occurring between two frames, including:
    means for performing a virtual overlay of two frames to be compared mutually offset both horizontally and vertically by amounts identified by the motion vector subjected to testing;
    means for applying a matching mask of pixels to be subjected to testing;
    means for calculating, for all pixels selected, a cost function; and
    means for identifying the vector with the lowest cost function value as the best vector for the purposes of estimation.

13. The system according to claim 12, in which said processor comprises a process that selects said vectors from the set composed of the following vectors:
    a last constant velocity vector;
    a penultimate constant velocity vector;
    an antepenultimate constant velocity vector;
    a constant acceleration vector;
    a constant deceleration vector;
    a null vector; and
    first and second circular acceleration vectors.

14. The system according to claim 12, in which said processor includes means for calculating a mean absolute error function as the cost function.

15. The system according to claim 12, in which said processor includes means for calculating an equation of the form:
    $\Sigma|p(i,j)-q(i+vx,j+vy)|*m(i,j)$, wherein:
    vx and vy are the horizontal and vertical components of the vector under consideration;
    p(x,y) are the pixels of a first frame, forced to zero if outside of the frame field;
    q(x,y) is a pixel of a second frame, forced to zero if outside of the frame field; and m(x,y) is the coefficient of the mask, with values of one if the respective pixels are to be included in the computation or zero if otherwise.

16. The system according to claim 12, wherein said processor further comprises means for applying to said at least one winning vector, refinement vectors, which are added to the said winning vector to produce at least one resulting vector and means for subjecting said resulting vector to candidate testing.

17. The system according to claim 16, wherein said processor further comprises means for subjecting said at least one resulting vector to testing based on said cost function.

18. The system according to claim 16, wherein said processor further comprises means for repeatedly applying said refinement vectors.

19. The system according to claim 12, wherein said processor further comprises means for saving a last sampled frame as a current frame and at least one previous frame to be used as a prediction frame.

20. The system according to claim 12, wherein said processor further comprises means for making an estimate for a current frame only on an immediately preceding frame.

21. The system according to claim 12, wherein said processor further comprises means for making an estimate for a current frame on a frame that is older than an immediately preceding frame.

22. The system according to claim 12, wherein said processor further comprises means for making an estimate for a current frame on a number of frames from amongst frames preceding the current frame.

23. A computer program product directly loadable into the internal memory of a digital computer and including software code portions adapted for implementing, when said computer program product is run on a digital computer, a process for performing an estimate of global motion based on a sequence of subsequent video images or the like, such subsequent video images being represented by digital signals arranged in frames, and, for each estimate of a frame with respect to another, comprising:

choosing, from amongst a series of vectors originating from linear combinations of motion vectors resulting from estimates of previous frames and/or constant vectors, at least one winning vector, considered as the best match for estimating the motion occurring between two frames, including:

performing a virtual overlay of the two frames to be compared mutually offset both horizontally and vertically by amounts identified by the motion vector subjected to testing;

applying a matching mask of pixels to be subjected to testing; and calculating, for all pixels selected via the grid, a cost function to determine the effectiveness of the predictor, identifying the vector with the lowest cost function value as the best vector for the purposes of estimation.

* * * * *